US012123565B2

(12) United States Patent
Thombre

(10) Patent No.: US 12,123,565 B2
(45) Date of Patent: Oct. 22, 2024

(54) LENS AND VEHICLE LAMP ASSEMBLY

(71) Applicant: North American Lighting, Inc., Paris, IL (US)

(72) Inventor: Ashwin Thombre, Farmington Hills, MI (US)

(73) Assignee: NORTH AMERICAN LIGHTING, INC., Paris, IL (US)

( * ) Notice: Subject to any disclaimer, the term of this patent is extended or adjusted under 35 U.S.C. 154(b) by 0 days.

(21) Appl. No.: 18/015,915

(22) PCT Filed: Jul. 13, 2021

(86) PCT No.: PCT/US2021/041415
§ 371 (c)(1),
(2) Date: Jan. 12, 2023

(87) PCT Pub. No.: WO2022/015720
PCT Pub. Date: Jan. 20, 2022

(65) Prior Publication Data

US 2023/0288039 A1 Sep. 14, 2023

Related U.S. Application Data

(60) Provisional application No. 63/051,230, filed on Jul. 13, 2020.

(51) Int. Cl.
*F21S 41/255* (2018.01)
*F21S 41/32* (2018.01)
(Continued)

(52) U.S. Cl.
CPC ........... *F21S 41/255* (2018.01); *F21S 41/322* (2018.01); *F21S 41/365* (2018.01); *F21Y 2115/10* (2016.08)

(58) Field of Classification Search
CPC ...... F21S 41/255; F21S 41/365; F21S 41/232; F21S 41/322; F21S 43/243; F21S 43/241; F21S 43/249; G02B 6/0018
See application file for complete search history.

(56) References Cited

U.S. PATENT DOCUMENTS 10,119,673 B2 * 11/2018 Nakajima ............ F21S 43/243
10,260,693 B1 * 4/2019 Shih ...................... F21S 43/243
(Continued)

FOREIGN PATENT DOCUMENTS

KR 10-2011-0093110 A 8/2011
KR 10-2012-0039961 A 4/2012

OTHER PUBLICATIONS

International Search Report and Written Opinion for Application No. PCT/US2021/041415, dated Oct. 27, 2021, 9 Pages.

*Primary Examiner* — Tracie Y Green
*Assistant Examiner* — Michael Chiang
(74) *Attorney, Agent, or Firm* — Brooks Kushman P.C.

(57) ABSTRACT

A vehicle lamp assembly is provided with at least one light source having an optical axis. A lens body a first body segment having a light-collection surface positioned adjacent the light source and from the light-collecting face to a first total-internal-reflection (TIR) surface. A middle body segment extends from the first TIR surface to a second TIR surface. A second body segment extends from the second TIR surface to a light emission surface defining an output optical axis. Light propagates in each of the first, middle and second segments in a generally collimated light path.

20 Claims, 4 Drawing Sheets

(51) Int. Cl.
*F21S 41/365* (2018.01)
*F21Y 115/10* (2016.01)

(56) References Cited

U.S. PATENT DOCUMENTS

| | | | | | |
|---|---|---|---|---|---|
| 10,808,902 | B1 * | 10/2020 | Lim | F21S 41/285 | |
| 11,149,914 | B2 * | 10/2021 | Risthaus | F21S 41/322 | |
| 2005/0162857 | A1 * | 7/2005 | Tsukamoto | F21S 41/155 | 362/509 |
| 2006/0087860 | A1 * | 4/2006 | Ishida | F21S 43/247 | 362/517 |
| 2006/0126353 | A1 * | 6/2006 | Ishida | F21S 41/321 | 362/543 |
| 2006/0285347 | A1 * | 12/2006 | Okada | F21S 41/37 | 362/516 |
| 2012/0250308 | A1 * | 10/2012 | Zwak | G02B 19/0061 | 362/249.02 |
| 2013/0188380 | A1 | 7/2013 | Sekiguchi | | |
| 2017/0038023 | A1 * | 2/2017 | Gromfeld | F21S 41/365 | |
| 2017/0254500 | A1 * | 9/2017 | Leugers | B60Q 1/14 | |
| 2018/0038569 | A1 * | 2/2018 | Hanulak | F21S 43/251 | |
| 2018/0149336 | A1 | 5/2018 | Tsai et al. | | |
| 2019/0316749 | A1 * | 10/2019 | Zorn | F21S 41/365 | |
| 2020/0010012 | A1 | 1/2020 | Ichikawa et al. | | |

* cited by examiner

LENS AND VEHICLE LAMP ASSEMBLY

CROSS-REFERENCE TO RELATED APPLICATION

This application is the U.S. national phase of International Application No. PCT/US2021/041415 filed on Jul. 13, 2021, which claims the benefit of U.S. provisional application Ser. No. 63/051,230 filed on Jul. 13, 2020, the disclosures of which are incorporated in their entirety by reference herein.

TECHNICAL FIELD

The present disclosure relates to a lens for a vehicle lamp.

BACKGROUND

Vehicles include various lamps and provide numerous functions such as illuminating surroundings, improving a driver's visibility or indicating intended direction of travel. Vehicle styling and packaging often dictate shape and geometry of the vehicle lamp. Regardless of lamp styling, functional requirements and government regulations must still be met.

SUMMARY

According to at least one embodiment, a vehicle lamp assembly is provided with at least one light source having an optical axis. A lens body a first body segment having a light-collection surface positioned adjacent the light source and from the light-collecting face to a first total-internal-reflection (TIR) surface. A middle body segment extends from the first TIR surface to a second TIR surface. A second body segment extends from the second TIR surface to a light emission surface defining an output optical axis. Light propagates in each of the first, middle and second segments in a generally collimated light path.

In another embodiment, the output optical axis of the light emission surface is offset in a middle direction from the optical axis of the light source.

In another embodiment, the first and second body segments are generally parallel.

In another embodiment, there are a plurality of light sources and the he light collecting portion has a plurality of light-collection surfaces wherein one light collection surface is oriented adjacent each of the light sources.

In another embodiment, the optical axis of each of the plurality of light sources is adapted to be oriented in a different direction.

In another embodiment, the plurality of light-collection surfaces comprises a plurality of collimators.

In another embodiment, at least one of the collimators is oriented at a non-zero angle relative to a vertical plane defined as a plane generally perpendicular with the output optical axis.

In another embodiment, at least one of the collimators is oriented at a rotated position being offset in two directions from the vertical plane, where the vertical plane is generally perpendicular to the output optical axis.

According to another embodiment, a vehicle lamp is provided having a light source with a light-source optical axis. A lens body has a collimator with a light-collection surface positioned adjacent the light source and adapted to collimate light from the light source in a direction generally parallel to the light source optical axis. A light-emission surface on the lens body defines an output optical axis. First and second total-internal-reflection (TIR) surfaces are disposed between the light-collection surface and the light-emission surface to reflect collimated light transmitted within the lens body. A middle body segment extends between the first and second TIR surfaces. The light-collection surface is spaced apart from the light emission surface by the middle body segment.

In another embodiment, the lens body has a first segment extending between the collimator and the first TIR surface and a second segment of the lens body between the second TIR surface and the light-emission surface.

In another embodiment, the collimator is oriented at a rotated position being offset in two directions from the vertical plane, wherein the vertical plane is generally perpendicular to the output optical axis.

In another embodiment, the middle body segment is positioned between the first body segment and second body segment and a middle direction of the collimated light is transverse to a first direction in the first body segment and transverse to a second direction in the second body segment.

In another embodiment, the output optical axis of the light emission surface is offset in the middle direction from the optical axis of the light source.

In another embodiment, the collimator is oriented at a profile angle from a horizontal plane, wherein the horizontal plane is coplanar with the output optical axis and is normal to the vertical plane.

In another embodiment, the collimator is oriented at a collimator angle, wherein the collimator angle is the angle between the light source optical axis and the output optical axis in the horizontal plane.

In another embodiment, an angle $\beta$ is the angle between the optical axis of the light source and a normal line to the first TIR surface and the angle $\alpha$ is the angle between the optical axis of the light source and the output optical axis, wherein the first TIR surface is oriented at an angle relative to the vertical XZ plane according to the relationship: $\sin-1 (\sin \beta * \sin \alpha)$.

In another embodiment, the angle $\beta$ is at least a critical angle of the material of the lens body to maintain total internal reflection.

In another embodiment, an axis of symmetry of the collimator is offset from the optical axis in a horizontal direction is oriented at the angle $\alpha$.

In another embodiment, the collimator angle and profile angle are generally equal.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Automotive lighting, such as headlamps or signal lamps, are increasingly styled features, requiring innovative geometries, such as light blades, to simultaneously meet federal regulations and customer style expectations that include completely obscuring the light source from the view of the end-user as well as high lit uniformity. Engineering feasible packaging solutions typically leads to sacrificing lit uniformity or efficiency, thus leading to poor appearance or increased product cost, respectively.

Figure 1:
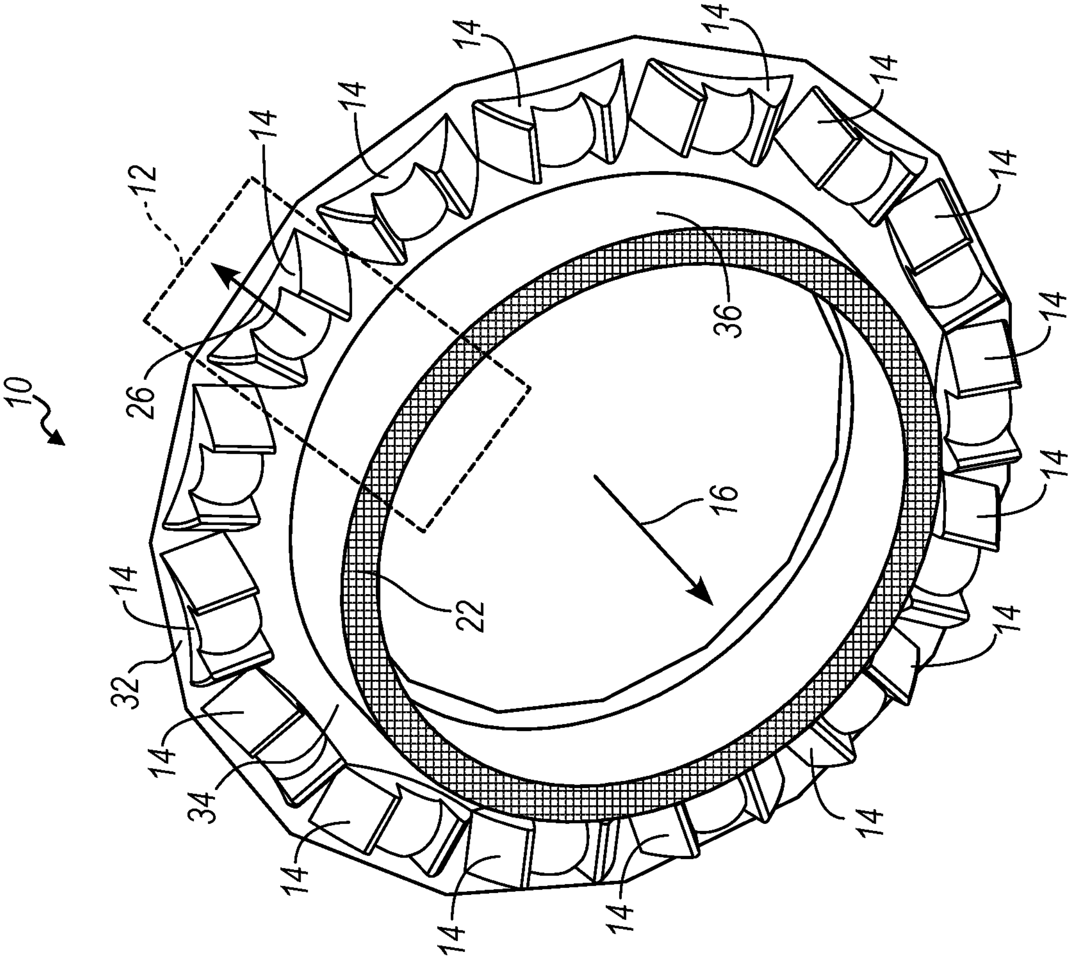
FIG. 1 is a front perspective view of a periscope blade lens for a vehicle lamp according to an embodiment of the present disclosure.

FIG. 1 illustrates a vehicle lamp 1, such as a vehicle headlamp, having a periscope blade lens 10 that overcomes these tradeoffs by simultaneously meeting requirements such as high efficiency, high lit uniformity and flexible packaging while completely obscuring the source from view. As illustrated in FIG. 1, the periscope blade lens 10 can be revolved around to form a light emission surface 22 that is generally circular shaped. FIGS. 3-15 illustrate a portion of the lens 12 in more detail. The lens 12 has a collimator 14 for high light collection and two total internal reflection (TIR) surfaces 18, 20 to bend light and send it in the direction of the optical axis 16.

Figure 4:
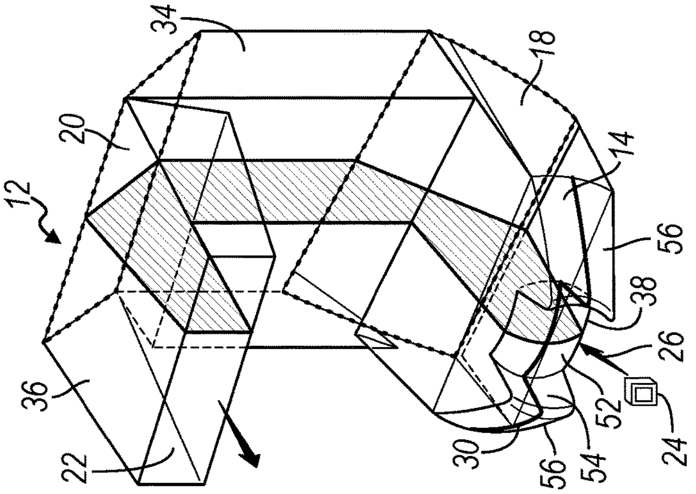
FIG. 4 is a portion of the periscope blade lens in FIG. 1 according to another embodiment of the present disclosure
Figure 5:
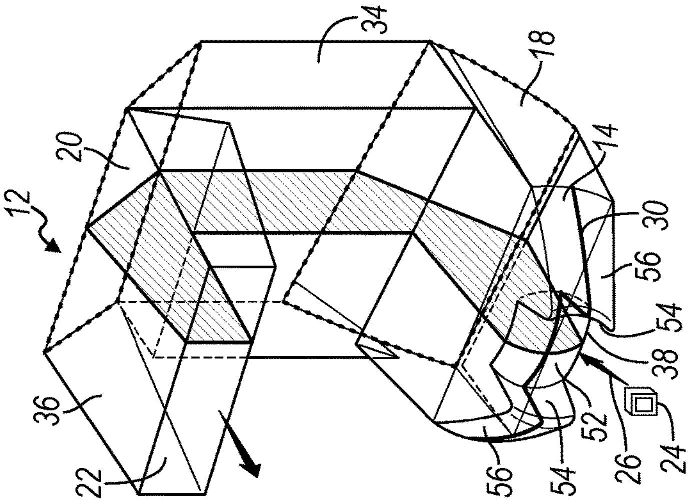
FIG. 5 is a portion of the periscope blade lens in FIG. 1 according to another embodiment of the present disclosure.
Figure 6:
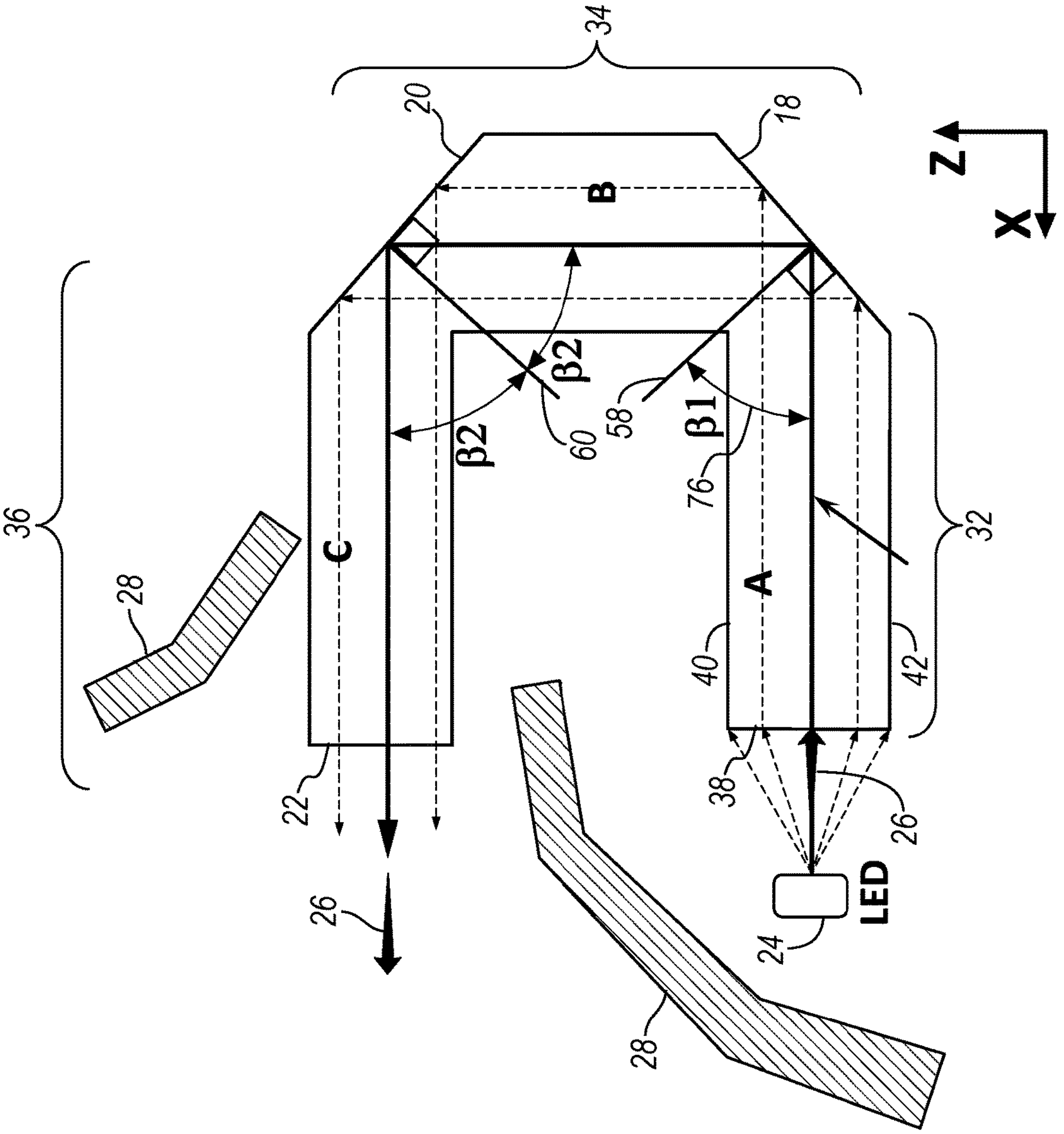
FIG. 6 is a section view of the lens. The section cut is shown in FIG. 3 and labeled 6-6.

Also, as shown in the section view in FIG. 6, the periscope blade lens 12 can wrap around a bezel element 28 in the vehicle lamp 1, thus completely obscuring the light source 24 from view. As shown in FIGS. 8-15, the design of the periscope blade lens 10 also allows for the light-source optical axis 26 to be non-parallel to the output optical axis 16 by adjusting the orientation of the collimator 14, further allowing flexible packaging while achieving the same shape and uniformity of light emission surfaces. As shown in FIG. 4 and FIG. 5, the periscope blade lens 12 has non-parallel optical axes 16, 26 but identical exit light emission surfaces 22 as FIG. 3 and all will achieve the same luminance. Multiple reflections allow for more mixing before light reaches the exit light emission surface 22 resulting in very high lit uniformity.

The periscope blade lens 12 has three segments that form the lens body: a lower body segment 32, a middle body segment 34 and an upper body segment 36.

The collimator 14 is formed at the end of the lower body segment 32. As shown in the Figures, the collimator may be a configuration of surfaces that efficiently collects light from the light source 24 and collimates the light. The collimator 14 is formed by revolving a light collimating profile 30 around the source optical axis 26 of the light source 24. The light collimating profile 30 is generally known within the industry, and is shaped to take the hemispherical light pattern and, using the index of refraction of the lens material, refracts and reflects the light into a generally collimated light pattern that is now traveling parallel to the light source optical axis 26 through the lower segment 32 of the lens 12. The light collimating profile 30 is positioned using the light source focal point and light source optical axis 26 as a reference point and line. If the light source focal point and light source optical axis 26 are translated or rotated, the light collimating profile 30 would translate or rotate by the same amount to maintain the efficiency of the light collection and distribution.

The light source 24 is located adjacent the collimator 14 of lower segment 32 of the lens 12. The light source 24 in may be is a light emitting diode (LED) which produces light from a semiconductor chip in a hemispherical pattern. It is possible that other light sources could be substituted as a comparable light source. The light source 24 has an optical axis 26 that extends away in a direction normal to source emission surface semiconductor chip. The light-source optical axis 26 is directed toward the lens 12. For reference, the forward/rearward directions are shown as the X-direction in the Figures.

The lower segment 32 has a top surface 40 and a bottom surface 42 that form the top and bottom edges of the collimator 14. The top surface 40 and bottom surface 42 are spaced apart with a separation distance and angle to facilitate manufacturing. For example, the periscope blade lens 12 may be manufactured with injection molding or any other suitable manufacturing methods could be used. The revolved light collimating profile 30 is terminated at the intersections of the top surface 40 and the bottom surface 42.

The collimator 14 includes a light collecting surface 38 that receives incident light from the light source 24 and refracts the light into the lens 12. The light collecting surface 38 includes a central refraction face 52 and side refraction faces 54 that refract incident light into the lens 12. The collimator 14 also includes internal reflection surfaces 56. The refraction faces 54 refract incident light towards the corresponding reflection face 56. The reflection faces 56 then reflect the light to be directed generally parallel to the light source optical axis 26 and away from the light source 24.

The light from collimator 14 is transmitted through the lens 12 generally parallel or collimated in the lower segment 32. This transmitted light in the lower segment 32 propagates in the direction A. In order to maintain high efficacy, the lens 12 may be formed from a high transmission material, typically in excess of 90% transmission, but may be formed of any optical transmissive material. For example, the lens 12 may be made of a lightweight and robust plastic material such as polycarbonate or acrylic or any suitable material known in the art.

Figure 3:
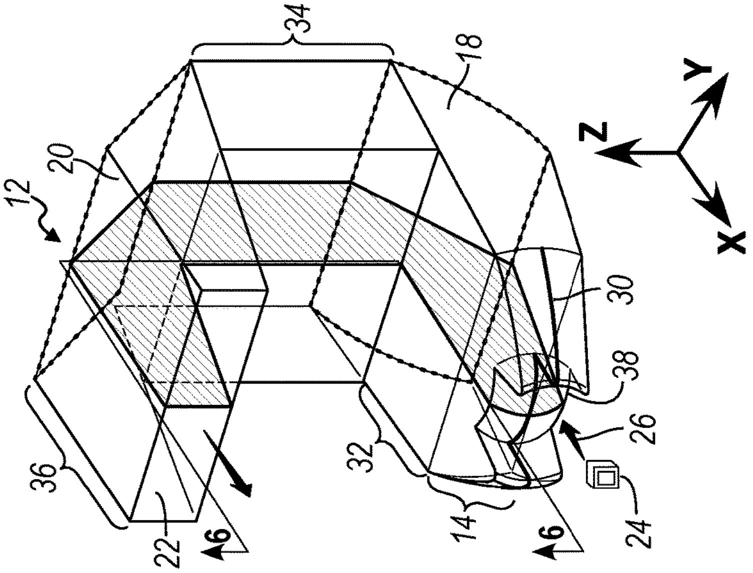
FIG. 3 is a front perspective view of a portion of the periscope blade lens in FIG. 1 according to one embodiment of the present disclosure.

As discussed in reference to FIG. 3 and FIG. 5, the periscope blade lens 12 is has three sections: a lower body segment 32, a middle body segment 34 and an upper body segment 36. The lower body segment 32, connects the collimator 14 to the first TIR surface 18. The collimated light propagates through the lower body segment 32 of the periscope blade lens 12 in a direction A. As shown, the direction A is generally parallel and colinear to the optical axis 26.

As shown in the section view of FIG. 6, the lower segment 32 has a generally rectangular profile. The profile may be shaped to so that all of the light A from the collimator 14 is to be incident on the first TIR surface 18 and none is blocked or reflected or refracted as it propagates through the lower segment 32 to maintain high efficacy and lighted uniformity.

The collimated light propagating through the lower segment 32 of the lens 12 in the direction A needs to dramatically change direction in order to exit the light emission surface 22 traveling in the direction of the output optical axis 16. The initial step to achieve the direction change is accomplished by the first TIR surface 18. The first TIR surface 18 changes the direction of the transmitted light using the principle of total internal reflection. The first TIR surface 18 is located rearward of collimator so the transmitted light propagating rearward in direction A will be incident on the first TIR surface 18.

The first TIR surface 18 is a flat planar surface. The first TIR surface 18 is positioned at an angle, β1 relative to the optical axis 26 or first direction A, such that the transmitted light will reflect off the first TIR surface 18 and propagate toward the second TIR surface 20 without being refracted. The β1 is the angle formed between a line 58 being normal to the first TIR surface 18 and the light source optical axis 26 or first direction A.

A person ordinarily skilled in the art understands that the angle β1 may not be less than the 'critical angle'. The critical angle is the minimum at which all light incident is reflected, and not refracted outside the lens. The first TIR surface is greater than the critical angle in order to achieve a high reflection efficacy. The critical angle is determined by the index of refraction properties of the lens material and the surrounding material (such as air). If the β angle becomes too small for the material chosen, a significant amount of light refracts out of the periscope blade lens 12 instead of reflecting off the TIR surfaces and remaining inside the periscope blade lens 12. Light that refracts out of the lens 12 at the TIR surfaces 18, 20 cannot be distributed to the light emission surface 22 and thus decreases efficiency. If the β1 angle is larger than the critical angle for the specific materials, than a total internal reflection will occur and none of the light escapes out of the lens 12 through refraction.

The first TIR surface 18 is size to be large enough to encompass, and thus reflect, all of the transmitted light from the lower segment 32. As a result, the four edges of the first TIR surface 18 are located entirely outside the transmitted light A 50 incident area on the first TIR surface 18. In this manner, generally all the transmitted light that is incident on the first TIR surface 18 can be reflected towards the second TIR surface 20 without excessive losses.

According to the laws of physics, the angle of incidence is equal to the angle of reflection. As shown in the example in FIG. 6, the incident β1 angle is approximately 45-degrees and is therefore also reflected at 45-degrees, therefore changing the travel direction by approximately 90-degrees to be transmitted to the middle body segment 34. The light in the middle body segment 34 remains generally collimated and traveling in the direction B toward the second TIR surface 20. As shown, the direction B is generally parallel to the Z-axis.

The middle segment 34 is constructed with the same principles as the lower segment 32. The middle segment 34 has a generally rectangular profile when cut with a horizontal plane X-Y shown in FIG. 6. Similar to the lower segment 32, the middle body segment 34 is shaped to avoid intersections with the transmitted light travelling in the direction B. The shape of the middle segment 34 could have a curvature or other shape as long as edge do not intersect the transmitted light from the TIR surface 18 traveling in direction B in order to not reduce the efficiency or optical performance of the periscope blade lens 12.

As shown in FIG. 6, the transmitted light propagating through the middle segment 34 is still not aligned with the desired output optical axis 16. Another significant change in the lights propagating direction is required. The second TIR surface 20 accomplishes this direction change using total internal reflection. The second TIR surface 20 angle of inclination is determined by taking the angular difference between the direction B and the output optical axis 16 and dividing it in half. This half angle is β2 or the critical angle for total internal reflection at the second TIR surface 20. Similar to β1, the material interface properties, including the index of refractions, determine a critical angle that is inherent to the two interfaced materials. As shown in FIG. 6, β2 is approximately 45-degrees, but as long as the β2 angle is larger than the critical angle for the materials chosen then total internal reflection will occur and the periscope blade lens 12 will achieve high efficacy and lighted uniformity.

The second TIR surface 20 is a flat planar surface. The second TIR surface 20 is positioned at an angle, β2 relative to the second direction B, such that the transmitted light will reflect off the second TIR surface 18 and propagate toward the exit surface 22 without being refracted. The β2 is the angle formed between a line 60 being normal to the second TIR surface 20 and the light direction B.

The second line 60 is created at the β2 angle and then the second TIR surface 20 is positioned normal to the second TIR line 60. The second TIR surface 20 sizes so all the transmitted light transmitted in the middle segment 34 in direction B is incident on the surface. Similar to first TIR surface 18, the shape of the second TIR surface 20 does not have an optical impact as long as all of the collimated light intersects the surfaces 18, 20 for the greatest efficiency.

As shown in FIGS. 3 and 6-9, once the transmitted light in direction B is total internally reflected off the second TIR surface 20, the light propagates forward in the direction C being through the upper body segment 36. The direction C is generally parallel to the output optical axis 16. The upper body segment 36 connects and supports the second TIR surface 20 to the light emission surface 22. The transmitted light propagates in the direction C to intersects the light emission surface 22.

The transmitted light exits the periscope blade lens 12 through the light emission surface 22. The light emission surface 22 forms the edge of the lens 12. As illustrated, the light emission surface 22 may be flat and generally normal to the direction C or the transmitted light so that minimal angular changes occur due to refraction as the light exits the lens 12 at the light emission surface 22 and to form the vehicle lamp 1 beam pattern.

The light emission surface 22 may also include optics, for example, that enhances uniformity of light. Alternatively, the second TIR surface 20 may include optics. As shown in FIGS. 3-15, the cross-section of the portion of the periscope blade lens 12 is generally "C" shaped where the lower segment 32 overlaps the upper segment 36. However, other cross-sections are possible such as "S" shaped where the lower segment 32 extends opposite the upper body segment 36 and does not overlap. Additional cross-sections and body segments may be possible.

In FIGS. 1-15 the light emission surface 22 is shown to be generally rectangular, however, it may have any suitable shape, such as in FIG. 1 since the light is generally collimated between the TIR surface 20 the exit surface 22 along the upper segment 36.

It is often desirable to have the light emission surface 22 be visible to an observer positioned in the front of the vehicle lamp 1, but to have the light source 24 be obscured from view. Obscuring the light source 24 blocks high intensity light emitting from the light source 24, which improves the lighted uniformity of the vehicle lamp 1. As shown in FIG. 6, the light source 24 can be obscured by positioning a bezel 28 in front of a portion of the periscope blade lens 12. By appropriately setting the distance between the light source 24 and the first TIR surface 18 and the second TIR surface 20 and the light emission surface 22, the light source 24 can be obscured behind the bezel 28 while keeping the light emission surface 22 visible.

A concealed light source is possible since the distance between the light source 24 and the first TIR surface 18, or the length of the lower segment 32 in the X axis direction, does not generally change the direction of the light or the amount of light output. Similarly the distance between the first TIR surface 18 and the second TIR surface 20, or the length of the middle segment 34 in the Z direction, and the distance between the second TIR surface 20 and the light emission surface 22, or the length of the upper segment 36 in the X direction, are also not optical significant as long as high transmission materials are chosen.

Thus, the length of the lower segment 32, middle segment 34, and upper segment 36 can be adjusted according to vehicle lamp 1 styling and packaging constraints. The three lengths can be changed to allow the transmitted light to travel rearward, up, and forward around a styled body or bezel 28 while still obscuring the light source 24 and maintaining high efficacy and lighted uniformity.

In some instances, adjusting the length of the three sections is not sufficient to obscure the light source 24 or to meet other vehicle styling and packaging restrictions. As shown in FIGS. 3-4 and 10-15, the periscope blade lens 12 provides a solution to allow non-parallel light source optical axis 26 and output optical axis 16.

The ability to tilt or rotate the light source 24, the light source optical axis 26 and collimator 14 at angles non-parallel to the output optical axis, while still maintaining an efficient and uniform light appearance, provides significant styling, packaging and performance advantages for a vehicle lamp 1. The vehicle lamp 1 can fit more tightly between other vehicle components which allows for smaller vehicle sizes which have numerous advantages including reduced weight and more aerodynamic shapes.

As shown in FIGS. 1-15, the lamp 1 can have a light source 24 with the optical axis 26 and collimator 14 located at various angles. The collimator angle 70, also called a in these examples, is the horizontal component angle that the light source 24 and its associated light source optical axis 26 create as measured to the X axis. In other words, the collimator angle 70 is the angle between the X axis and the light source optical axis 26 when both are projected in the Z axis direction onto a horizontal XY plane. Since the collimator 14 and lower segment 32 are constructed from the light source 24, light source focal point and light source optical axis 26, their construction described above is unaffected by the light source optical axis 26 direction being non-parallel to the output optical axis 16. Using the light source optical axis 26 set at an angle $\alpha$ results in the light collecting surface 38 and lower segment 32 being built at an angle. But in order for the periscope blade lens 12 to still efficiently and uniformly provide light to the output optical axis 16, which is still parallel to the X axis, two changes are required to the embodiments shown in FIGS. 3, and 7-9.

Figure 15:
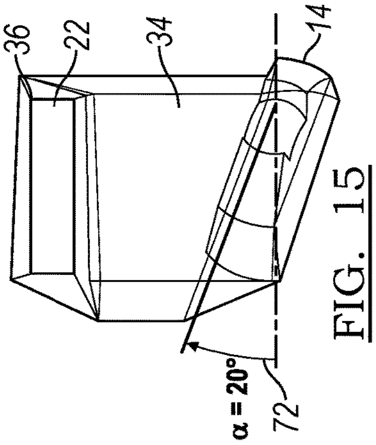
FIG. 15 is a front view of the lens embodiment shown in FIG. 5.
Figure 12:
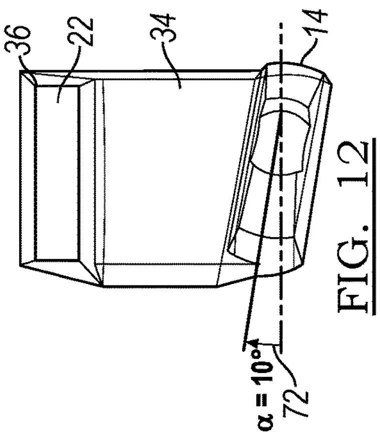
FIG. 12 is a front view of the lens embodiment shown in FIG. 4.
Figure 7:
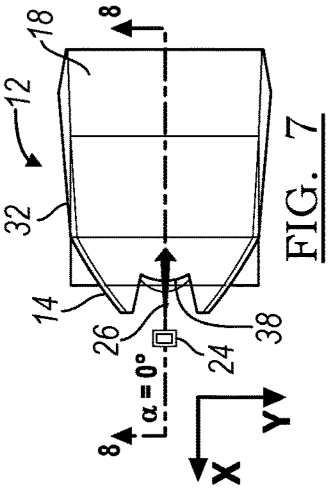
FIG. 7 is a top view of the lens embodiment shown in FIG. 3.
Figure 8:
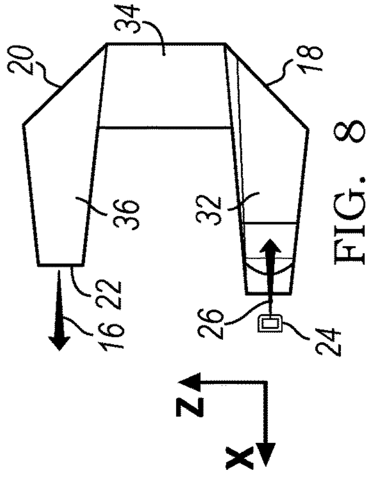
FIG. 8 is a section view of the lens. The section is cut is shown in FIG. 7 and labeled 8-8.
Figure 9:
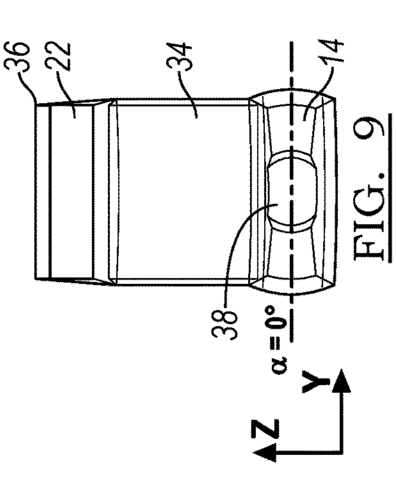
FIG. 9 is a front view of the lens embodiment shown in FIG. 3.

As shown in FIGS. 9, 12 and 15 the first change required to achieve high efficiency and high lit uniformity in the periscope blade lens 12 with the light source optical axis 26 set at an angle $\alpha$, or the collimator angle 70, is that the light collecting surface 38 and lower segment 32 also needs to rotated to a profile angle 72. The profile angle 72 rotates the light collecting surface 38 such that the first TIR surface 18 can be created to maintain the high efficacy and light uniformity through the total internal reflection that the surface produces. The efficiency and lighted uniformity are maximized when the profile angle 72 and the collimator angle 70 are the same angular value which is why both are referred to as a.

Figure 13:
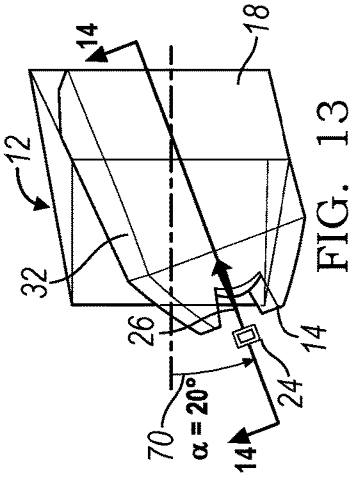
FIG. 13 is a top view of the lens embodiment shown in FIG. 5.
Figure 14:
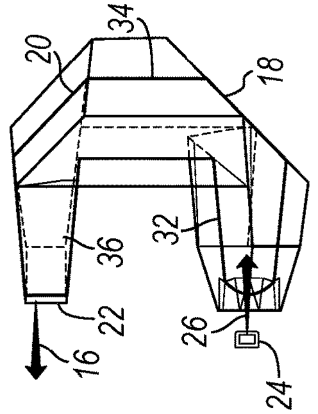
FIG. 14 is a section view of the lens. The section is cut is shown in FIG. 13 and labeled 14-14.
Figure 10:
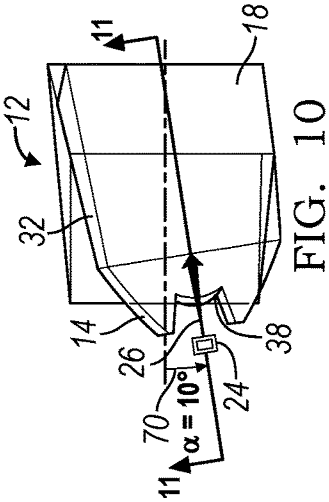
FIG. 10 is a top view of the vehicle lamp embodiment shown in FIG. 4.
Figure 11:
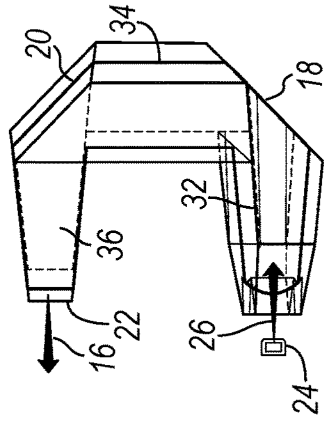
FIG. 11 is a section view of the lens. The section is cut is shown in FIG. 10 and labeled 11-11.

As shown in FIGS. 9, 12 and 15 the light collecting surface 38 and lower segment 32 are both rotated by the same a angle using the light source optical axis 26, located at the light source focal point, as the rotation axis. When the collimator angle 70 is counterclockwise as shown in FIGS. 10 and 13 looking from a downward, or negative Z axis perspective, the profile angle 72 will be clockwise as shown in FIGS. 12 and 15 looking from a forward, or negative X perspective.

The second change requited to achieve high efficiency and high lit uniformity in the periscope blade lens 12 with the light source optical axis 26 set at an angle $\alpha$, or the collimator angle 70, is to the inclination angle of the normal of the first TIR surface 18 with respect to the XZ plane. As described above, the inclination of the first TIR surface 18 is dependent on the critical total internal reflection angle, or $\beta 1$ angle, chosen. If the collimator angle 70, a, is equal to zero, then the first TIR surface 18 inclination angle only need the $\beta 1$ angle to maintain an efficient and uniform light reflection while its normal remains parallel to the XZ plane, but in embodiments that have a non-zero a angle, then the $\alpha$ angle needs to be considered in the inclination of the normal of the first TIR surface 18 with respect to the XZ plane in order to produce the correct Z axis direction for the transmitted light B.

As shown in FIGS. 6, 8, 11 and 14, the first TIR angle 76 that produces the correct Z axis high efficiency and uniform reflection of the transmitted light B off the first TIR surface 18 is measured to the vertical YZ plane. The first TIR angle 76 between the first TIR surface 18 and the vertical plane is measured in a vertical section that contains the light source optical axis 26 and light source focal point. The actual value of the first TIR angle 76 is determined from a calculation that requires the two previously described angles $\alpha$ and $\beta 1$. The angle of the normal of the first TIR surface to the XZ plane that provides maximum efficacy can be calculated using the equation $\sin^{-1}(\sin \beta 1 \cdot \sin \alpha)$.

For example, the embodiments of the lens 12 shown in FIGS. 3 and 7-9, $\alpha=0°$. So, the light source optical axis 26 and the output axis 16 are parallel but directed 180-degrees in opposite directions from each other. Since $\alpha=0°$ and the $\sin(0°)=0$ then the normal of the first TIR surface 18 is equal to 0-degrees, or parallel to the XZ plane to provide high efficacy and uniformly lighted light emission surface 22.

For the embodiments shown in FIGS. 4 and 10-12, $\alpha=10°$ so the light source optical axis 26 and the output axis 16 are directed 170-degrees in opposite directions from each other. Since $\alpha=10°$ and then the angle of the normal of the first TIR surface 18 to the XZ plane is equal to $\sin^{-1}(\sin \beta 1 \cdot \sin 10)$ to provide high efficiency and uniformly lighted light emission surface 22.

Similarly, for the embodiments shown in FIGS. 5, 13-15 $\alpha=20°$ so the light source optical axis 26 and the output axis 16 are directed 160-degrees in opposite directions from each other. Since $\alpha=20°$ and then the angle of the normal of the first TIR surface 18 to the XZ plane is equal to $\sin^{-1}(\sin \beta 1 \cdot \sin 20)$ to provide high efficacy and uniformly lighted light emission surface 22. In fact, following the methods described, a highly efficient and very uniformly lighted appearance can be achieved for any given a angle from 0-degrees to 90-degrees by using the formula for the normal of the first TIR surface 18 to the XZ plane.

The construction principle of the remaining elements of the periscope blade lens 12 after the first TIR surface 18 remain unchanged from what has been described above. The transmitted light in the direction B is used to determine the profile of the middle segment 34 and the location of the second TIR surface 20. The inclination of the second TIR surface 20 is determined as the half angle between the transmitted light and the output axis 16 or the direction C. The direction C of transmitted light is used to determine the size of the upper segment 36 and the light emission surface 22.

Thus, the periscope blade lens 12 provides a method to efficiently and uniformly distribute light form a light source optical axis 26 that is dramatically different than the desired output optical axis 16.

For simplicity a change in the light source optical axis 26 in the vertical axis has not yet been discussed. If the light source optical axis were to also rotate up or down vertically about the Y axis, the construction principles would remain unchanged. The $\beta 1$ angle would change according to the new light source optical axis 26 but the first TIR angle would still be calculated correctly. The transmitted light B could be propagating in a direction non-parallel to the Z axis but as long as the half angle method of determining $\beta 2$ provided an angle larger than the critical TIR angle, then the periscope blade lens 12 would maintain its efficiency and uniformity.

For the embodiments in FIGS. 3 and 7-9, the top surface 40 and bottom surface 42 are positioned and angled symmetrically about a horizontal plane that is coplanar with the light source focal point. A symmetric top surface 40 and bottom surface 42 about a horizontal plane through the light source focal point results in improved efficacy and lighted uniformity for the vehicle lamp 1, but non-symmetric surfaces could also be used to terminate the revolved light collimating profile 30.

As shown in FIGS. 1-15, the light emission surface 22 is generally wider in the Y axis than it is tall in the Z axis. The shape of the light emission surface 22 may be chosen based on desired styling, or light output pattern, packaging requirements in combination with material and manufacturing method limitations.

Figure 2:
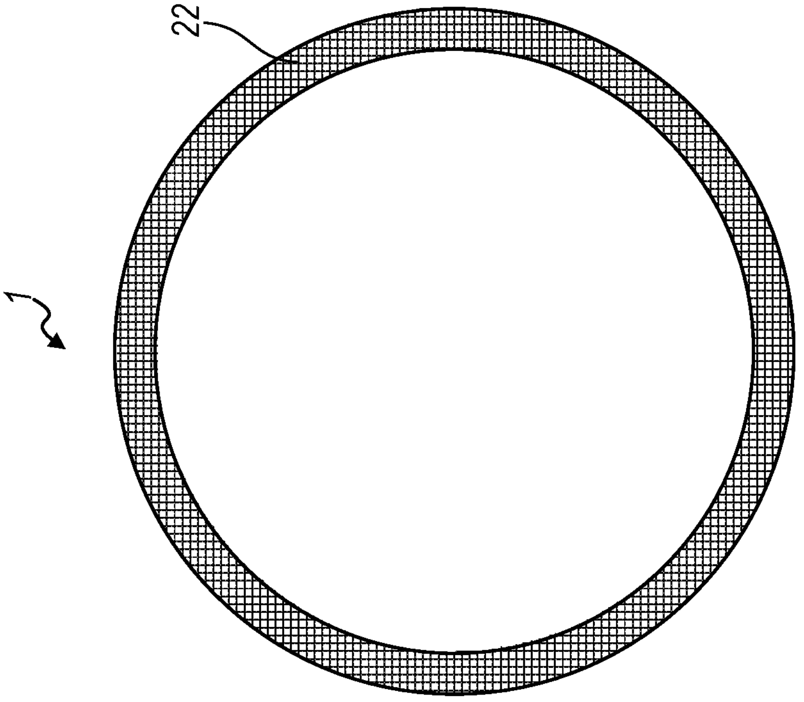
FIG. 2 is a lighted appearance rendering front view of the vehicle lamp shown in FIG. 1.

As shown in FIGS. 1 and 2, the periscope blade lens 12 can formed of a plurality of lens portions combined to create shaped light emission surface profiles for the vehicle lamp 1. In the embodiment in FIG. 1, periscope blade lens 12 has a plurality of collimators 14 each having a light collecting surface 38. The lamp 1 in FIGS. 1 and 2 has a plurality of light sources 24, where one light source 24 is positioned adjacent each light collecting surface 38 of each collimator 14. As shown in FIG. 1, the periscope lens 14 has fifteen collimators 14. The lower segment 32, middle segment 34 and upper segment 36 are adjoining to define a continuous light emission surface 22 combining the light from each of the plurality of light sources. Additionally, the light emission surface 22 in the individual periscope blade lens 10 has been created with the top and bottom edges curved. The resultant adjoined light emission surface 22 forms a continuous circular light emission surface. Using the same concept of adjoining individual portion of periscope lens 12 to form a continuous light emission surface 22, various combinations of curved and straight light emission surfaces could be envisioned.

When multiple periscope blade lens portions 12 may be joined to create the lens 10 for a vehicle lamp 1, each individual periscope blade lens 12 maintains a unique light source optical axis 26. Because the periscope blade lens 12 allows the light source optical axis 26 to be non-parallel to the output optical axis 16, there can be a plurality of non-parallel light source optical axis 26 in a single vehicle lamp 1. Using vector geometric calculations, the light source optical axis 26 can be combined to create a resultant vector that is the lamp source axis. The lamp sources axis can also be non-parallel to the output optical axis 16 which provides significant styling and packaging flexibility.

The following are reference numerals:

1—vehicle lamp
10—periscope blade lens
12—portion of periscope blade lens
14—collimator
16—output optical axis
18—first TIR surface
20—second TIR surface
22—exit light emission surface
24—light source
26—light source optical axis
28—bezel element
30—light collimating profile
32—lower section
34—middle section
36—upper section
38—light collecting surface
40—top surface
42—bottom surface
52—central refraction face
54—side refraction surface
56—internal reflection surface of the collimator
58—first normal line
60—second TIR normal line
70—collimator angle
72—profile angle
76—first TIR angle While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle lamp assembly comprising:
at least one light source having an optical axis; and
a lens body comprising:
a first body segment having a light-collection surface positioned adjacent the light source and extending to a first total-internal-reflection (TIR) surface;
a middle body segment extending from the first TIR surface to a second TIR surface;

a second body segment extending from the second TIR surface to a light emission surface defining an output optical axis, wherein light propagates in each of the first, middle and second segments in a generally collimated light path, wherein the output optical axis is oriented generally opposite direction from the optical axis of the light source.

2. The vehicle lamp assembly of claim 1, wherein the output optical axis of the light emission surface is offset in a middle direction from the optical axis of the light source.

3. The vehicle lamp assembly of claim 1, wherein the first and second body segments are generally parallel.

4. The vehicle lamp assembly of claim 1, wherein the at least one light source comprises a plurality of light sources; and wherein the light-collection surface comprises a plurality of light-collection surfaces, wherein one light collection surface is oriented adjacent one of the light sources, wherein the light emission surface is continuous and forms a curved light output.

5. The vehicle lamp assembly of claim 4, wherein the optical axis of each of the plurality of light sources is adapted to be oriented in a different direction.

6. The vehicle lamp assembly of claim 4, wherein the plurality of light-collection surfaces comprises a plurality of collimators.

7. The vehicle lamp assembly of claim 6, wherein at least one of the collimators is oriented at a non-zero angle relative to a vertical plane defined as a plane generally perpendicular with the output optical axis.

8. The vehicle lamp assembly of claim 7, wherein at least one of the collimators is oriented at a rotated position being offset in two directions from the vertical plane, wherein the vertical plane is generally perpendicular to the output optical axis.

9. A vehicle lamp assembly comprising:

a light source having a light-source optical axis; and a lens body comprising:

a collimator having a light-collection surface positioned adjacent the light source and adapted to collimate light from the light source in a direction generally parallel to the light-source optical axis;

a light-emission surface defining an output optical axis, first and second total-internal-reflection (TIR) surfaces disposed between the light-collection surface and the light-emission surface to reflect collimated light transmitted within the lens body;

a middle body segment extending between the first and second TIR surfaces, wherein the light-collection surface is spaced apart from the light-emission surface by the middle body segment, wherein the output optical axis of the light-emission surface that extends in a forward direction and an axis of symmetry of the collimator is oriented in a rearward direction that is generally opposite the output optical axis.

10. The vehicle lamp assembly of claim 9, wherein the lens body has a first body segment extending between the collimator and the first TIR surface and a second body segment of the lens body between the second TIR surface and the light-emission surface.

11. The vehicle lamp assembly of claim 10, wherein the collimator is oriented at a rotated position being offset in two directions from a vertical plane, wherein the vertical plane is generally perpendicular to the output optical axis.

12. The vehicle lamp assembly of claim 10, wherein the middle body segment is positioned between the first body segment and second body segment, and a middle direction of the collimated light is transverse to a first direction in the first body segment and transverse to a second direction in the second body segment.

13. The vehicle lamp assembly of claim 12, wherein the output optical axis of the light-emission surface is offset in the middle direction from the light-source optical axis.

14. The vehicle lamp assembly of claim 10, wherein the collimator is oriented at a non-zero angle relative to a vertical plane defined as a plane generally perpendicular with the output optical axis.

15. The vehicle lamp assembly of claim 9, wherein the collimator is oriented at a profile angle from a horizontal plane, wherein the horizontal plane is coplanar with the output optical axis and is normal to a vertical plane.

16. The vehicle lamp assembly of claim 15, wherein the collimator is oriented at a collimator angle, wherein the collimator angle is an angle between the light-source optical axis and the output optical axis in the horizontal plane.

17. The vehicle lamp assembly of claim 16, wherein the collimator angle and profile angle are generally equal.

18. The vehicle lamp assembly of claim 9, wherein an angle $\beta$ is an angle between the light-source optical axis and a normal line to the first TIR surface and the angle $\alpha$ is an angle between the light-source optical axis and the output optical axis, wherein the first TIR surface is oriented at an angle relative to the vertical plane being:

$$\sin^{-1}(\sin\beta*\sin\alpha).$$

19. The vehicle lamp assembly of claim 18, wherein the angle $\beta$ is at least a critical angle of the material of the lens body to maintain total internal reflection.

20. The vehicle lamp assembly of claim 18, wherein an axis of symmetry of the collimator is offset from the light-source optical axis in a horizontal direction, and is oriented at the angle $\alpha$.

* * * * *